July 31, 1928.                  1,679,234
O. A. A. TENOW
THREAD CUTTING TAP
Filed Aug. 13, 1926
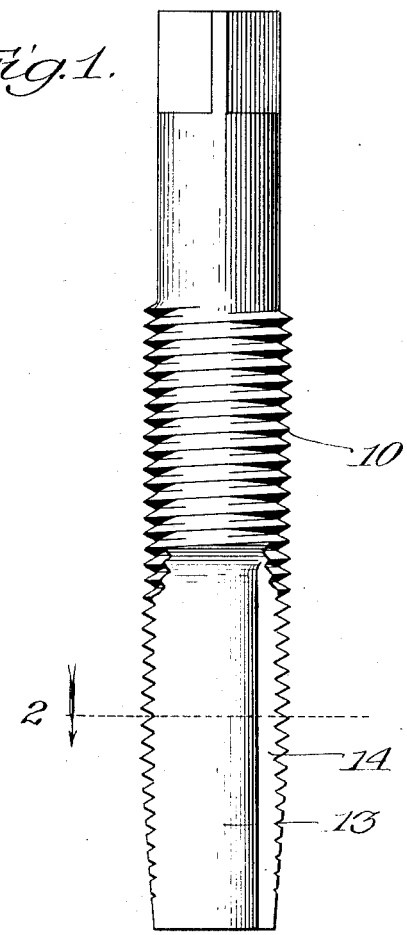
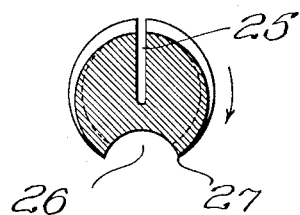
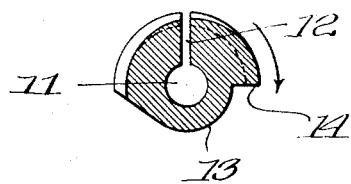
Inventor:
Olaf A. A. Tenow, Patented July 31, 1928.

1,679,234

UNITED STATES PATENT OFFICE.

OLOF A. A. TENOW, OF CHICAGO, ILLINOIS, ASSIGNOR OF ONE-HALF TO JUSTUS P. SEEBURG.

THREAD-CUTTING TAP.

Application filed August 13, 1926. Serial No. 128,976.

As a preface to a description of my invention, it may be stated that as taps have hitherto been constructed the forming thereby of accurate threads is practically impossible due to outward deflection of the cutting edge portions of the tap in encountering relatively hard, and therefore highly resistant, portions of the metal of the object, being tapped and which commonly exist, particularly in iron and steel, owing to the non-homogeneous character thereof. The cutting portions of the tap being subjected to non-uniform resistance during the cutting operation, the thread produced thereby is caused to be deeper adjacent the harder portions of the metal and is thus rendered non-uniform and inaccurate, with the manifest disadvantages.

My object is to provide a construction of tap by the use of which the objections above pointed out will be avoided and accurate threads be produced.

Referring to the accompanying drawing:—

Figure 1 is a view in side elevation of a tap comprising one embodiment of my invention. Figure 2 is a section taken at the line 2 on Fig. 1 and viewed in the direction of the arrow; and Figure 3, a cross-sectional view of still another embodiment of the invention, the section being taken at a line corresponding with line 2 on Fig. 1.

Referring first to the construction illustrated in Figs. 1 and 2, the tap comprises a body portion threaded, as represented at 10, with the extremity of its cutting-end portion tapered, generally as shown and as in the case of taps of common form. The tap is centrally longitudinally apertured, throughout its length, as represented at 11 and is slotted longitudinally, as represented at 12, preferably throughout the length of the threaded portion of the body; this slot opening through the extremity of the cutting end portion of the latter. The side portion of the body opposite the slot 12 is cut away at 13, from a point between the ends of the threads to the extremity of the cutting-end portion of the body preferably to cause the tap to present substantially throughout the length of this cut-away portion, a contour substantially as shown (see Fig. 2). The cutting edge portions of the tap are represented at 14, the tap in the forming of a thread being rotated in the direction of the arrow in Fig. 2.

The cross-sectional form of the tap is such, as shown, that when the cutting edge portion 14 encounters, in the cutting operation, a relatively hard portion of the object being threaded, that portion of the tap at one side of the slot 12 and which is equipped with the cutting edge, yields to the left in Fig. 2 and thus the cutting edge swings inwardly in a direction away from the surface being cut and gouging of the surface being cut is avoided. As the surface being cut is operated on successively by the cutting edges of the tap, the tap will operate by successive engagement of its cutting edges with such relatively hard portions of the object, which deform the tap as stated, to accurately thread these portions of the object, so that such threaded portions will be of the same depth and contour as the other portions of the thread, whereby a uniform thread will be produced in the object.

Referring to the construction shown by a cross-sectional view in Fig. 3, this constitutes another form of tap of the slotted type and provides a cutting edge of a highly desirable angular shape. This construction, the cutting edge of which is represented at 27, is the same as that of Figs. 1 and 2, except that the tap is not centrally apertured; the slot, represented at 25 and corresponding with the slot 12, is deeper than the latter; and the cut-away portion 26 corresponding with the cut-away portion 13 is narrower.

It will be understood that when the cutting edge 27 encounters a relatively hard portion of the object being threaded, the part of the tap at one side of the slot 25 and carrying the cutting edge portion, will deform to the left in Fig. 3 permitting the cutting edge portion to move inwardly toward the axis of the tap, an accurate and uniform thread being produced in the object by reason of the subjection of the latter to successive cutting actions during the rotation of the tap.

It will be understood as to both of the constructions shown the cutting edge portion of the tap is never caused to gouge into the surface being threaded either because of the deformation or yielding of the body portion of the tap in a direction to project the cutting edge toward the surface being cut, or because of the deformation of the cutting edge proper, or the metal immediately adjacent thereto in a direction toward such surface.

While I have illustrated and described certain particular forms of construction constituting embodiments of my invention, I do not wish to be understood as intending to limit my invention thereto as it may be embodied in other forms of construction without departing from the spirit of my invention.

What I claim as new, and desire to secure by Letters Patent, is:

1. A thread-cutting tap having a thread-cutting portion with a portion thereof at one side of its axis extending lengthwise of the tap cut away to provide cutting edges, said tap being slotted lengthwise thereof at the other side of its axis, with the slot so disposed that the cutting edge portions of the tap move toward the axis thereof when encountering the resistance of relatively hard portions of the work.

2. A thread-cutting tap having a thread-cutting portion with a portion thereof extending lengthwise of the tap cut away to provide cutting edges, said tap containing a slot extending in the direction of the length of the tap and opening through a side of the tap opposite that at which said cutting edges extend and of such depth that, in the flexing of the cutting-edge-equipped portion of the tap in encountering relatively hard portions of the work, the flexure occurs elsewhere than at the side of the axis of the tap opposite that at which said cutting portions are located.

3. A thread-cutting tap having a thread-cutting portion with a portion thereof extending lengthwise of the tap cut away to provide cutting edges, said tap containing a slot extending in the direction of the length of the tap and opening through a side of the tap opposite that at which said cutting edges extend and of such depth that, in the flexing of the cutting-edge-equipped portion of the tap in encountering relatively hard portions of the work, the flexure occurs elsewhere than at the side of the axis of the tap opposite that at which said cutting portions are located, said slot at its inner extremity being of enlarged width.

4. A thread-cutting tap having a thread-cutting portion with a portion thereof extending lengthwise of the tap cut away to provide cutting edges, said tap containing a slot extending in the direction of the length of the tap and opening through a side of the tap opposite that at which said cutting edges extend and of such depth that, in the flexing of the cutting-edge-equipped portion of the tap in encountering relatively hard portions of the work, the flexure occurs elsewhere than at the side of the axis of the tap opposite that at which said cutting portions are located, said slot at its inner extremity being of enlarged width and of curved form in cross section.

5. A thread-cutting tap having a thread-cutting portion with a portion thereof extending lengthwise of the tap cut away to provide cutting edges, said tap containing a slot extending in the direction of the length of the tap and opening through a side of the tap opposite that it which said cutting edges extend and of such depth that, in the flexing of the cutting-edge-equipped portion of the tap in encountering relatively hard portions of the work, the flexure occurs elsewhere than at the side of the axis of the tap opposite that at which said cutting portions are located, said slot at its inner extremity being of enlarged width and of curved form in cross section and the outer surface of the tap at said curved portion of said slot being curved generally in conformance with the curved wall of said slot.

OLOF A. A. TENOW.